United States Patent Office 2,870,108
Patented Jan. 20, 1959

2,870,108

NOVEL SILICA PRODUCTS AND SILICONE RUBBER CONTAINING SAME COATED SILICA AEROGEL, SILICONE RUBBER REINFORCED THEREWITH AND METHOD OF MAKING

Ralph F. Nickerson, Marblehead, Mass., assignor to Monsanto Chemical Company, St. Louis, Mo., a corporation of Delaware No Drawing. Application May 6, 1954
Serial No. 428,115

22 Claims. (Cl. 260—29.1)

The present invention relates to novel silica products, particularly novel silica aerogels, and to processes of producing such products. The present invention also relates to improvements in silicone rubber compositions, particularly reinforced silicone rubber compositions, and to processes of preparing such compositions.

The present application is a continuation-in-part of my copending application Serial No. 349,309, filed April 16, 1953, now abandoned. In this copending application there is described a process of treating silica aerogels having an acid number below 0.8 with various water-insoluble organic silicates such as, for example, tetraethyl silicate (also known as tetraethyl orthosilicate). The resultant product, which has an acid number below 0.8, may be partially or completely hydrophobic depending on various factors, including, for instance, the amount and kind of organic silicate applied. Such product is useful for the preparation of reinforced silicone rubbers, for example, by incorporating the product in a silicone gum using conventional milling equipment, after which the resulting mixture is cured or vulcanized to form the reinforced silicone rubber.

It has been proposed heretofore to incorporate silica aerogels in silicone or siloxane rubbers or elastomers as a reinforcing filler. Silica aerogels of relatively high acid content or relatively high acid number may be incorporated in silicone gums, prior to curing, by milling. Moreover, the mixtures thus formed may be aged and then re-milled prior to curing without appreciable difficulty. However, after the composition is cured to form an elastic rubber composition or article, the article loses considerable weight on standing or during use at high temperatures, for example, 400 to 500° F. On the other hand, silica aerogels which are neutral or contain only relatively small amounts of acid can be incorporated in silicone gums prior to curing, but the resulting composition cures to some extent on aging and either cannot be remilled or can be remilled only with great difficulty prior to the final curing operation.

In accordance with the present invention, it is possible to overcome the disadvantage heretofore encountered with the use of silica aerogel reinforcing fillers which are slightly acid, and it is also possible to prepare reinforced silicone rubbers which are superior in physical properties to and exhibit less weight loss at high temperatures than silicone rubbers reinforced with silica aerogels containing relatively higher amounts of acid constituents. It is also possible in accordance with the present invention to treat silica materials, and particularly silica aerogels, having certain properties which limit their usefulness to provide novel silica materials having properties which enable their use for a variety of purposes for which the untreated silica material could not be used advantageously or with maximum efficiency.

It is one object of this invention to provide novel silica products, and particularly novel silica aerogels, which are suitable for a wide variety of uses.

It is a further object of this invention to provide novel silica products, and particularly novel silica aerogels, which are particularly suitable as reinforcing fillers in the production of silicone rubbers.

It is a further object of this invention to provide novel reinforced silicone rubber compositions which do not exhibit detrimental weight loss.

It is a further object of this invention to provide a process of producing novel silica products, and particularly novel silica aerogels, which are suitable for a wide variety of uses.

Still further objects and advantages of the present invention will become apparent from the following descriptions and the appended claims.

The present invention is based on the discovery that when hydrophilic, amorphous, water-insoluble hydrated silica or silicic acid containing a large number (that is, one thousand or more) of silanol

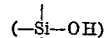

groups and having an acid number above 0.2 is brought into contact with an organic silicate having at least two —OR groups attached to a silicon atom which is also attached to at least one other oxygent atom, wherein R is an alkyl, aryl, aralkyl, or alkaryl radical, a product is obtained which is hydrophilic, partially hydrophobic but non-organophilic (that is, preferentially wetted by water water when shaken with a mixture of water and n-butanol), partially hydrophobic and organophilic (that is, preferentially wetted by n-butanol when shaken with a mixture of water and n-butanol) or completely hydrophobic and organophilic, depending primarily upon the amount and particular species of organic silicate used. Even though the starting silica material is hydrophilic, that is, capable of being wetted preferentially with water when shaken with a mixture of water and n-butanol, and the treated material may also be hydrophilic, there is a considerable difference in the utility of the two materials which indicates that the surface chemical composition and surface properties of the two materials are quite different.

The silica material which is employed as the starting material in the present invention may be silica which has been hydrated with water, or polymerized silicic acid, or partially dehydrated silicic acid. Since these materials are hydrophilic (preferentially wetted with water) yet water-insoluble solids containing a large number (a thousand or more) of silanol groups

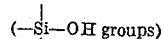

they are hereinafter referred to as hydrophilic silica materials containing a multitude of silanol groups. The hydrophilic silica materials which are suitable for use in the present invention are those which have an acid number above 0.2 but below 5, and the preferred silica materials are those having an acid number between 0.3 and 3. Although the hydrophilic silica material may vary as to its physical properties, it is desirable to use hydrophilic silica materials having a surface area of at least 80 square meters per gram, as measured by the method of Brunauer, Emmett and Teller described in the Advances in Colloid Science, vol. I, pages 1–36 (1942), published by Interscience Publishers Inc., New York, N. Y., preferably a surface area between 100 and 600 square meters per gram. It is also desirable to employ hydrophilic silica materials which have a white color, a bulk density below 10 pounds/cubic foot, preferably between 2 and 8 pounds per cubic foot, and an ultimate particle size between about 5 and 40 millimicrons. The ultimate particle size is the size of the average particle, as delineated by an electron microscope, in a silicone rubber prepared by thorough milling of the silica material in a silicone gum followed by curing or vulcanization of the gum.

As examples of hydrophilic silica materials which have the above described physical properties and also the above described acid number, may be mentioned silica aerogels. Such aerogels may be prepared, for example, by the processes described in Kistler Patent No. 2,093,454, the White Patent No. 2,285,477 and the Marshall Patent No. 2,285,449. Another suitable hydrophilic silica material may be prepared by the following method or by obvious modifications thereof. Two liters of an aqueous solution containing 45 grams $H_2SO_4$ are heated to 80° C., and then two liters of an aqueous solution of sodium silicate containing 4% $SiO_2$ and having a molar ratio of $SiO_2:Na_2O$ of 3:36 are added with stirring over a period of 15 minutes. The temperature is maintained at 80° C. throughout the mixing and thereafter the solution is cooled to 50° C. and adjusted to a pH of 5, whereupon it gels. The gel is broken up, filtered, and the filter cake is washed on the filter with water. The filter cake is then dried at a temperature of 50° C. until it contains about 1% by weight of residual free water.

The term "acid number" as used herein in connection with the hydrophilic silica materials is intended to mean the number of milligrams of KOH required to neutralize one gram of silica material to a pH of 5.2. This acid number is suitably determined by thoroughly mixing 4 grams of dry silica material with 100 milliliters of distilled water and then titrating the resulting suspension with 0.01 N sodium hydroxide to a pH of 5.2 as measured by glass electrodes which have been standardized against an aqueous buffer solution at a pH of 4.0. The acid number is calculated by the following equation:

$$\frac{\text{Milliliters of NaOH solution} \times N \times 0.0561 \times 1000}{4} =$$

milligrams of KOH per gram of silica material, or acid number

In the above equation N represents the normality of the NaOH solution.

The treatment of the hydrophilic silica material with the organic silicate results in a reaction or chemical change as is indicated by the fact that the organic silicate cannot be extracted from the resulting product with an organic liquid which is a solvent for the organic silicate employed. The organic silicate reacts with some of the silanol groups of the hydrophilic silica material whereby one of the R radicals of the organic silicate replaces the hydrogen of the silanol group to form a

group on the silica material, and also a silanol compound having an —OR group and an —OH group attached to a silicon atom which is attached to at least one other oxygen atom, wherein R has the significance hereinbefore described. This silanol compound partly reacts with other silanol compounds formed from the silicate to form a polymerized organic silicate which is no longer soluble in a solvent for the starting organic silicate and part of the silanol compound reacts with the silanol groups of the silica material to form a structural unit

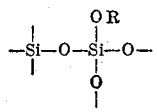

where R has the significance hereinbefore described, and the free valences of the oxygen atoms are satisfied by silicon atoms or R radicals. To illustrate, when the organic silicate is a compound having the structural formula

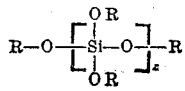

where $x$ is an integer from 1 to 20 and R has the significance hereinbefore given, the silicate reacts with some of the silanol groups of the hydrophilic silica material to form a silica material having some

groups, and also a silanol compound having the structural formula

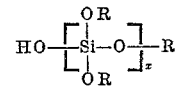

This silanol compound reacts in part with silanol groups of the silica material to form

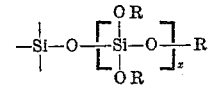

groups as part of the silica material, and also reacts in part with other silanol groups formed from the silicate to form a polymer of the organic silicate. Since the silica material contains small amounts of moisture, for example, from about 0.1 to 2% by weight, which hydrolyzes some R radicals from the silanol compound, the polymer formed is of high molecular weight and is insoluble in an organic solvent for the starting organic silicate. The product obtained is a silica material containing silanol groups,

groups and

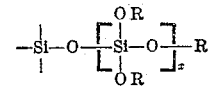

groups and having a surface film of a polymer of the starting organic silicate, namely a polymer having the structural formula

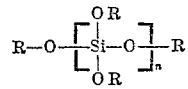

where $n$ is an integer above 25. The film of the polymer may be discontinuous or continuous depending primarily on the amount of organic silicate employed. The product will be hydrophilic, partially hydrophobic but non-organophilic, partially hydrophobic and organophilic or completely hydrophobic and organophilic depending on the number of silanol groups present and the nature of the polymer film on the surface of the silica material which is governed by the amount and kind of organic silicate applied to the silica material. Even though the product may be hydrophilic it has a chemical composition and surface properties which are materially different from those of the starting silica material, due to the fact that it contains considerably fewer silanol groups and has at least a partial film of polymerized organic silicate.

In the various formulas herein given the free valences of the silicon atoms are satisfied by oxygen atoms which are attached to hydrogen atoms and/or other silicon atoms.

The hydrophilic silica material may be contacted or treated with the organic silicate in various ways. Thus, the hydrophilic silica material may be immersed in a substantially anhydrous solution of the organic silicate and then removed or separated from the solution and allowed to stand until a dry or substantially dry product is obtained. The resulting product is then comminuted or ground, preferably in an air attrition mill, and consists of solid silica materials having the surface structure thereof altered as hereinbefore described, but having substantially the same surface area, appearance and bulk density as the starting material.

The hydrophilic silica material may also be treated during a comminuting or grinding operation with vapors of the organic silicate or with a fine spray consisting of droplets of the organic silicate or with droplets of a substantially anhydrous solution of the organic silicate in an organic liquid which is a solvent for the silicate. It is possible to maintain the solid silica particles in a free-flowing condition during the grinding or comminuting operation by controlling the number of droplets applied to the silica material. The grinding or comminuting is preferably carried out using an air grinding mill, for example, of the type illustrated in Figure 51 on page 1145 of Chemical Engineers' Handbook (3rd edition), published by McGraw-Hill of New York, N. Y. The grinding or comminuting is preferably carried out in an atmosphere of air which is at a temperature sufficiently high to prevent the condensation of water on the silica material but below the decomposition temperature of the organic silicate. Suitable air temperatures for this purpose are above 100° C., and preferably between 110 and 200° C. The product obtained by this procedure is comparable to the product produced by the immersion treatment described in the preceding paragraph, but the application during the grinding or comminuting is more economical and is therefore preferred over the immersion process. When the hydrophilic silica material is a silica aerogel, the application of the organic silicate during the grinding or comminuting operation has an advantage over the immersion process since the former process does not alter the physical properties of the aerogel whereas an immersion process has a tendency to shrink the aerogel to some extent and thus alter the physical properties of the aerogel. This may be detrimental for some uses. The rate at which the spray of the organic silicate is applied to the silica material may be varied depending on the particular hydrophilic silica material treated, the kind or organic silicate used and the organic liquid, if such is used, in which it is dissolved, the properties of the product desired and the amount of the hydrophilic silica material being treated. In general, the silicate is applied in droplets at the rate of about 20 to 40 parts by weight per 100 parts by weight of the silica material, although these rates and proportions may be varied considerably depending on the product desired and the concentration of the silicate applied.

The silica aerogels may also be treated after such aerogels have been formed in an autoclave, but prior to the removal of the aerogel from the autoclave, with vapors of the organic silicate, or with a spray of fine droplets consisting of the organic silicate, or with a spray of fine droplets consisting of the organic silicate dissolved in a substantially anhydrous liquid which is a solvent for the silicate. The treatment is continued until the silica aerogel has the desired properties and thereafter the silica aerogel is removed or ground to the desired particle size.

In carrying out the grinding or comminuting operations described in the three preceding paragraphs, it is desirable to continue the grinding or comminution operation until the treated silica materials have an aggregate particle size between 0.01 and 15 microns. It is preferred to grind or comminute the silica materials until 70% or more of the particles are between about 1 and 5 microns, about 10% are below 1 micron and the remainder are between about 6 and 15 microns.

By carrying out the processes described herein, it is possible to produce hydrophilic silica products, partially hydrophobic products which are non-organophilic in that they are wetted preferentially by water when shaken with a mixture of water and n-butanol, partially hydrophobic products which are organophilic in that they are preferentially wetted by n-butanol when shaken with a mixture of water and n-butanol, and organophilic and hydrophobic products. The particular product obtained depends upon the amount and kind of organic silicate applied to the starting silica material. In general, when tetraethyl orthosilicate is employed, it is possible to obtain hydrophilic to partially hydrophobic products which are non-organophilic in that they are preferentially wetted with water when shaken with a mixture of water and n-butanol, by applying from about 3 to about 20% by weight of such silicate, based on the dry silica material. If the amount applied is appreciably below 3%, the product is not sufficiently different from the starting silica material and does not differ sufficiently in utility therefrom. The preferred amount is about 4 to 10% by weight. In the case of tetramethyl orthosilicates the lower limit is about 4% and the upper amount may be about 25%, whereas in the case of silicates having R radicals containing more than 2 carbon atoms or silicates having a higher molecular weight than tetraethyl orthosilicate the lower amount applied may be as low as 2% by weight and the upper limit is about 15% by weight. It is thus seen that the amount of organic silicate applied to the silica material to obtain a hydrophilic to partially hydrophobic, nonorganophilic product, that is, one which is preferentially wetted with water when shaken with a mixture of n-butanol and water, is between 2 and 25% by weight, based on the dry silica material, depending on the particular organic silicate used.

To produce partially hydrophobic, organophilic products, that is, products which are preferentially wetted by n-butanol when shaken with a mixture of water and n-butanol, but are wettable with water when allowed to float thereon for a period of time, larger amounts of organic silicate must be employed. In general, when tetraethyl orthosilicate is used, it is possible to produce such products by applying above 20% by weight and up to about 30% by weight of such silicate based on the dry silica material. In the case of tetramethyl orthosilicate, the lower limit is above 25% and the upper amount may be as high as 35% by weight, whereas in the case of silicates having a higher molecular weight than tetraethyl orthosilicate the lower amount is usually above 15% and the upper limit is usually as high as 25% by weight. It is thus seen that the amount of organic silicate required to obtain this kind of product is above 15% and up to 35% by weight, based on the dry silica material, depending on the particular organic silicate used.

It is usually not practical to produce silica products which are organophilic and completely hydrophobic by the use of the organic silicates described herein since the amount of organic silicate required is generally excessive and tends to materially alter the physical properties of the starting silica material. However, it is possible in some instances to obtain such products by applying about 20% by weight or more, based on the dry silica material, of an organic silicate having a molecular weight above 900. The upper limit should be such that the physical properties of the starting silica material are not materially altered, and preferably should not exceed about 35% by weight.

The partially hydrophobic silica materials, for example those which have been treated with from about 5 to 20% by weight of the organic silicate, based on the dry silica material, may be rendered more hydrophobic by aging or by heating at elevated temperatures for varying periods of time. For example, the treated materials may be aged at room temperatures or they may be heated at atmospheric pressure or sub-atmospheric pressure at temperatures above 80° C. but below the decomposition temperature of the organic silicate, preferably between 100° and 300° C. for periods of 5 minutes to 24 hours, with the longer periods corresponding to the lower temperatures.

As is pointed out previously herein, the organic silicate may be a liquid organic silicate having two —OR groups attached to a silicon atom which is also attached to at least one other oxygen atom, wherein R is an alkyl, aryl, aralkyl or alkaryl radical, including, for example, the alkyl esters of orthosilicic acid and dehydration products thereof and alkyl esters of metasilicic acid. A suitable class of compounds for use in the treatment of the silica materials are the compounds having the structural formula

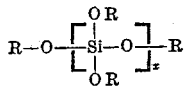

where R has the same significance as given above, and $x$ is an integer from 1 to 20, including, for example, tetrabenzyl orthosilicate and tetraphenyl orthosilicate. A particularly suitable class of compounds are those having the structural formula

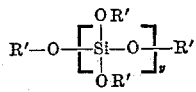

where R' is an alkyl radical having from 1 to 6 carbon atoms and $y$ is an integer from 1 to 10, including such compounds as tetramethyl orthosilicate, tetraethyl orthosilicate, tetrapropyl orthosilicate, tetrabutyl orthosilicate and the like and the various polymers thereof containing from 2 to 10 —Si—O— units. The preferred compound of this class is tetraethyl orthosilicate as it is readily available and gives excellent results. Polyethyl orthosilicates having from 2 to 10 —Si—O— groups in the molecule are also especially suitable, as are mixtures thereof with tetraethyl orthosilicate. As examples of other organic silicates which may be used may be mentioned organic esters, particularly alkyl esters, of tetrasilicic acid, meta-disilicic acid and meta-trisilicic acid; polyhydric alcohol silicates such as secondary glycol silicate, tertiary glycerol silicate and the like; and condensed polyhydric alcohol silicates.

The treated silica materials, and particularly those which are hydrophilic, may be used as flatting agents in lacquers as described and claimed in the application of Lyman S. Allen filed on even date herewith and which is assigned to the same assignee as the present application. The treated silica materials may also be used as thickening agents, and the partially to completely hydrophobic materials may be used for thickening various types of oils. If the oils are thickened sufficiently they may be used as greases having good resistance to water. The treated silica materials may also be used for insulation. The treated silica materials which have an acid number of 0.2 but below 0.8 and which are at least partially hydrophobic are especially suitable for use as reinforcing fillers for silicone rubbers as will be described in greater detail hereinafter.

It has presently been found that when a silica material, particularly a silica aerogel, having an acid number below 0.8 but preferably above 0.2 is rendered at least partially hydrophobic with the organic silicate, while retaining the original structure of the silica material as hereinbefore described, its properties as a reinforcing filler for silicone gums or rubbers are considerably superior to those of the untreated silica material or to those of a silica material having a higher acid number or to those of a treated silica material of the same acid number but which is not at least partially hydrophobic. Thus, silica materials, whether treated or untreated, which have an acid number below 0.8, but are not at least partially hydrophobic, are not satisfactory from the standpoint of the remilling of a silicone gum-silica material mix which has been allowed to age prior to curing, while the silica materials which have an acid number above 0.8 cause excessive weight losses at high temperatures in a silicone rubber containing such materials as the reinforcing filler. The treated silica materials of this invention which are at least partially hydrophobic and have an acid number above 0.2 but below 0.8 do not have the foregoing disadvantages.

The partially to completely hydrophobic silica materials having an acid number below 0.8, but preferably above 0.2, may be incorporated in a large variety of vulcanizable or silicone rubber-forming silicone or siloxane gums for the preparation of reinforced silicone or siloxane rubbers or elastomers having desirable physical properties and exceedingly low weight loss on heating during storage or use, and this may be accomplished in various ways. Thus, the partially hydrophobic silica material may be incorporated in the silicone gum by compounding with differential rubber rolls or by mixing in a Banbury or Baker-Perkins dough mixer or by using conventional milling equipment. The compounding of these ingredients may be carried out in the presence of a silicone vulcanizing agent such as a peroxide as, for example, benzoyl peroxide, or a perbenzoate such as tertiary butyl perbenzoate, and the resulting mixture may then be cured or vulcanized by heating at a temperature above 110° C., but below the thermal decomposition temperature of the silicone gum to form the reinforced silicone rubber product. However, the full advantages of the partially to completely hydrophobic silica materials are only obtained when the initial compounded mixture of the silicone gum and the partially to completely hydrophobic silica material is allowed to age at temperatures below the curing or vulcanizing temperature and is then remilled prior to the curing or vulcanizing step. Accordingly, the present invention is directed primarily to the manufacture of reinforced silicone or siloxane rubbers where such aging and remilling steps are carried out prior to curing or vulcanization of the silicone gum-silica material mixture. In such procedure, the aging period and temperatures may vary considerably and are not particularly critical. Usually, the aging period is more than 5 days and generally from 7 to 100 days at temperatures of about 60° to 100° F.

The weight ratio of the partially to completely hydrophobic silica material to silicone gum employed may be varied considerably depending on the physical properties desired in the cured or vulcanized rubber. However, for most purposes satisfactory results are obtained by using from about 15 to about 55 parts by weight of the hydrophobic silica material for every 100 parts by weight of silicone gum. Best results are usually obtained by employing from about 25 to 50 parts by weight of the hydrophobic silica material for every 100 parts by weight of silicone gum, and, accordingly, such amounts are preferred. Of course, other reinforcing fillers for silicone rubbers may be used to replace part of the hydrophobic silica material filler, but in such cases at least 10 parts by weight of such hydrophobic silica material per 100 parts of silicone gum should be employed in order to obtain the advantages of the hydrophobic silica material filler.

The kind and amount of vulcanizing agent used and the particular vulcanization temperature employed may be varied considerably as will be apparent to those skilled in the silicone rubber art. Thus, it is possible to use from about 1 to 6 parts by weight of vulcanizing agent per 100 parts of silicone gum, and the vulcanization or curing of the silicone gum-hydrophobic silica material mixture may be carried out at temperatures between about 110 and 225° C.

A large variety of silicone gums may be used in combination with the partially to completely hydrophobic silica material to provide elastic or rubbery products. For example, it is possible to use the organopolysiloxane gums or gels in which in which the silicon atoms are connected to each other by oxygen atoms through silicon-oxygen linkages

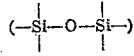

and which have an average of 1.75 to 2.25 mono-valent organic radicals attached through carbon-silicon linkages to each silicon atom, such as those organo-polysiloxane gums or gels described in U. S. Patent No. 2,460,795. Of these organo-polysiloxanes, those which contain an average ratio of from about 1.95 to 2.0 of mono-valent organic groups per silicon atom are preferred. A particularly suitable class of silicone gums are the methyl silicone gums prepared by heating the hydrolyzate of a very pure dimethyl dichloro-silane in the presence of a small amount of an agent which is capable of increasing the molecular weight of the hydrolyzate without inducing cross-linking. As examples of such agents may be mentioned iron chloride, sodium hydroxide, potassium hydroxide and sulfuric acid. After the gum is formed it is washed to remove such agent, and the resulting gum may be dried and then compounded with the organophilic silica material. The methyl silicone gums are also known as dimethyl-polysiloxanes.

Silicone gums prepared by the copolymerization of at least 90% dimethylsiloxane and not more than 10% of a different diorgano-siloxane such as diphenyl siloxane may also be employed with the organophilic silica material to provide valuable reinforced silicone rubbers.

The preferred treated silica materials are those which are partially to completely hydrophobic, and have the structure of an aerogel as defined in Kistler Patent No. 2,093,454. The partially to completely hydrophobic silica aerogels provide reinforced silicone rubbers which have superior physical properties, for example, superior elongation and tensile strength, compared to other hydrophobic silica materials which do not have an aerogel structure. Accordingly, the partially to completely hydrophobic silica aerogels are preferred over other silica materials in the preparation of reinforced silicone rubbers.

The reinforced silicone rubbers of this invention comprise a vulcanized silicone rubber in which is embedded fine particles, usually below 1 micron, and, preferably having an ultimate particle size between 5 and 40 millimicrons, of a partially to completely hydrophobic silica material, as hereinbefore defined, having an acid number below 0.8, but preferably above 0.2. These silicone rubber products have good physical properties and do not exhibit detrimental weight loss as in the case of silicone rubbers reinforced with untreated or treated silica materials having an acid number above 0.8. Moreover, the silicone rubbers reinforced with the partially to completely hydrophobic silica aerogels have superior physical properties as compared to silicone rubbers reinforced with treated hydrophilic silica aerogels which are not at least partially hydrophobic but have the same acid number, or untreated silica aerogels having the same acid number or other partially to completely hydrophobic silica materials having the same acid number.

A further understanding of the products and processes of the present invention will be obtained from the following specific examples which are intended to illustrate this invention but not to limit the scope thereof, parts and percentages being by weight.

*Example I*

Two hundred parts of silica aerogel particles having a bulk density of 5.6 pounds per cubic foot, an acid number of 0.6, an aggregate particle size below 5 microns (specifically between 1 and 3 microns), a surface area of about 175 square meters per gram and a moisture content of about 1%, were mixed thoroughly with a solution of 40 parts of n-butyl ether, 500 parts of diethyl ether and 30 parts of tetraethyl orthosilicate. The resulting mixture, which was in the form of a paste, was allowed to stand until it was substantially free of the ether solvents. This product was then comminuted until particles of the original silica aerogel aggregate size were obtained. The resulting product had substantially the same physical properties as the starting silica aerogel, but the surface thereof contained silanol groups,

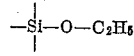

groups,

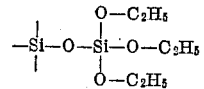

groups and a discontinuous film of polymerized tetraethyl orthosilicate which could not be removed by extraction with diethyl ether. The product was non-organophilic in that it was preferentially wetted with water when shaken with a mixture of water and n-butanol, but was only partially hydrophobic in that it was wetted by water after standing on the surface of water for several hours.

Forty parts of the product, prepared as described immediately above, were milled with 100 parts of a water-white, putty-like dimethylpolysiloxane gum in the presence of 1%, based on the total ingredients, of benzoyl peroxide until a uniform mixture was obtained. This mixture was allowed to age for 7 days at 80° F. and was then remilled and finally cured at a temperature of 150° C. for 1 hour. The resulting product comprised a dimethyl polysiloxane rubber containing the partially hydrophobic silica aerogel particles having an ultimate particle size of 30 millimicrons and an acid number of 0.6. This product had a tensile strength of about 850 pounds per square inch and an elongation of about 300%, whereas a mixture prepared from the same dimethyl polysiloxane gum and an untreated silica aerogel having an acid number of 0.6 could not be remilled after aging for 7 days at 80° F. and, hence, gave a product which was not suitable as a silicone rubber.

A reinforced silicone rubber prepared in the same way as described above, but using an untreated silica aerogel having an acid number of 1.1 had only a tensile strength of about 700 pounds per square inch and an elongation of about 250%.

*Example II*

Particles of silica aerogel having a bulk density of 5.6 pounds per cubic foot, an acid number of 0.85, a surface area of about 130 square meters per gram and a moisture content of about 1% were supplied to the feed jet of a small grinding device of the type illustrated in Figure 51 on page 1145 of Chemical Engineers' Handbook (3rd edition), published by McGraw-Hill of New York, N. Y., at the rate of 110–120 grams per minute for a period of 25 minutes. Simultaneously, tetraethyl orthosilicate was sprayed into the straight down section of the device at the rate of 6 cubic centimeters per minute over the same 25 minute period. Grinding was carried out using air at a temperature of 130° C. and pressure of 55–60 pounds per square inch at the rate of 80 cubic feet per minute. At the end of this period of time grinding of the silica aerogel particles was discontinued and the particles were collected in a cyclone separator. The collected particles had an average particle size between 1 and 3 microns and had the same physical properties and acid number as the starting silica aerogel, but the surface thereof contained more silanol groups and fewer

groups and

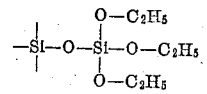

groups than the product of Example I. The product also contained a discontinuous coating of polymerized tetraethyl orthosilicate which could not be removed from the product by extraction with diethyl ether. The product was partially hydrophobic but was non-organophilic in that it was preferentially wetted with water when shaken with a mixture of water and n-butanol.

The product was particularly useful as a flatting agent in nitrocellulose lacquer in that the particles did not aggregate on standing but gave a soft settling voluminous precipitate which was readily redispersed by simple stirring.

*Example III*

Silica aerogel particles having a bulk density of 5.6 pounds per cubic foot, a surface area of about 175 square meters per gram, an acid number of 0.6 and a moisture content of about 1% were treated using the procedure described in the first paragraph of Example II with the exception that the tetraethyl orthosilicate was supplied at the rate of 30 cubic centimeters per minute and the collected particles were heated at 150° C. for a period of 12 hours. The product was similar to that of Example I, but differed therefrom in that it was organophilic and more hydrophobic, and gave a reinforced silicone rubber having a higher tensile strength and elongation than the product of Example I.

*Example IV*

Silica aerogel particles having a bulk density of 5.6 pounds per cubic foot, a surface area of about 130 square meters per gram, an acid number of 1.9 and a moisture content of about 1.5% were treated using the procedure described in the first paragraph of Example II with the exception that the tetraethyl orthosilicate was supplied at the rate of 13 cubic centimeters per minute. The product was similar to that of Example I, but showed no shrinkage and had an acid number of 1.9. This product was particularly useful as a flatting agent in nitrocellulose lacquer in that the particles did not aggregate on standing but gave a soft settling voluminous precipitate which was readily dispersed by simple stirring.

The silica aerogel employed in the foregoing Examples I and III was prepared according to the following procedure. Two thousand parts of water were mixed with 1175 parts of 93% sulfuric acid, after which 1800 parts of a sodium silicate solution containing 20.2% of silica ($SiO_2$) were added to the sulfuric acid-water solution with vigorous agitation to provide an acidic silica aquasol containing 15.8% $SiO_2$ and having a pH of 2.7 (glass electrode). Two hundred and seventy nine parts of 95% ethyl alcohol were added to the silica aquasol with vigorous stirring, after which 180 parts and 1535 parts, respectively, of the 95% ethyl alcohol were added with vigorous stirring to form an alcosol containing 8.6% $SiO_2$ and 5.9% $Na_2SO_4$. The temperature of this alcosol was about 50° F. The alcosol was then centrifuged to remove $Na_2SO_4 \cdot 10H_2O$ crystals, and the centrifuged alcosol was then adjusted to a pH of 3.6 (glass electrode) by adding, with vigorous agitation, a 10% aqueous solution of sodium bicarbonate. The resulting alcosol was then rapidly heated in an autoclave above the critical temperature of the alcohol-water vehicle in the alcosol, and the pressure in the autoclave was allowed to rise above the critical pressure of the liquid while allowing vapor to slowly escape from the autoclave to avoid excessive pressure. In this way the internal structure of the gel formed during the autoclaving was preserved without appreciable shrinkage. The silica aerogel product in the autoclave was then comminuted to the described particle size.

Suitable starting silica aerogels having an acid number below 0.8 may also be prepared by the processes described in the White Patent No. 2,285,477, the Marshall Patent No. 2,285,449 and the Kistler Patent No. 2,093,454. However, not all silica aerogels produced by the processes of the foregoing patents have an acid number below 0.8, and, therefore, when it is desired to start with silica aerogels having an acid number below 0.8 it is necessary to select only those silica aerogels which have such an acid number.

What is claimed is:

1. A process of producing improved silica aerogels which comprises comminuting in an air attrition mill hydrophilic silica aerogel particles having an acid number between 0.3 and 3, a surface area between 100 and 600 square meters per gram, a bulk density of 2 to 8 pounds per cubic foot and an ultimate particle size between about 5 and 40 millimicrons and concurrently spraying said particles with droplets containing tetraethyl orthosilicate, said silicate being applied in amounts of about 3 to 20% by weight, based on the dry silica aerogel particles, whereby silica aerogels are obtained which are hydrophilic to partially hydrophobic but non-organophilic, said comminuting step being carried out in an atmosphere of air at a temperature between about 110 and 200° C. until said aerogel particles have an aggregate particle size between 0.01 and 15 microns.

2. A process of producing silica aerogel particles which are especially suitable for reinforcing silicone rubbers which comprises comminuting in an air attrition mill hydrophilic silica aerogel particles having an acid number above 0.2 but below 0.8, a surface area between 100 and 600 square meters per gram, a bulk density of 2 to 8 pounds per cubic foot and an ultimate particle size between about 5 and 40 millimicrons and concurrently spraying said aerogel particles with droplets containing tetraethyl orthosilicate, said silicate being applied in amounts of about 3 to 20% by weight, based on the dry silica aerogel particles, to render the aerogel particles partially to completely hydrophobic, said comminuting step being carried out at a temperature between about 110 and 200° C. until said aerogel particles have an aggregate particle size between 0.01 and 15 microns.

3. A process of producing improved silica materials which comprises applying to particles of hydrophilic, amorphous, water-insoluble, finely divided silica having an acid number above 0.2 but below 5 and containing 1000 and more silanol groups, from about 2 to 25% by weight, based on the dry silica aerogel particles, of an organic silicate having the general formula:

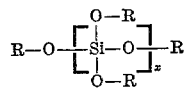

where R is an alkyl radical having from 1 to 6 carbon atoms and x is an integer from 1 to 20, while retaining the structure of said silica, and comminuting said silica until the particles thereof have an aggregate particle size between 0.01 and 15 microns, said silica being at least partly comminuted at some stage after the application of said organic silicate.

4. A process of producing a reinforced silicone rubber which comprises incorporating in a vulcanizable organo-polysiloxane gum in which the silicon atoms are connected to each other through silicon-oxygen linkages and which has an average of 1.75 to 2.25 methyl radicals attached through carbon-silicon linkages to each silicon atom, hydrophilic to partially hydrophobic but non-organophilic particles of the reaction product of (1) amorphous, hydrophilic, water-soluble finely divided silica having an acid number above 0.2 but below 0.8 and containing 1000 and more of silanol groups and (2) from 2 to 25% by weight, based on the dry silica, of an organic silicate having the general formula:

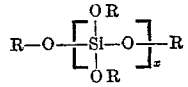

where R is an alkyl radical having from 1 to 6 carbon atoms and x is an integer from 1 to 20, and subsequently vulcanizing the resulting mixture to a rubber state in the presence of a vulcanizing agent for said gum selected from the group consisting of peroxides and perbenzoates, said particles having an aggregate size between 0.01 and 15 microns.

5. A process of producing a reinforced silicone rubber which comprises milling (1) from 15 to 55 parts by weight of hydrophilic to partially hydrophobic but non-organophilic particles having an aggregate size between 0.01 and 15 microns of the reaction product of (A) a silica aerogel having an acid number above 0.2 but below 0.8 and (B) from 2 to 25% by weight, based on the dry aerogel particles, of an organic silicate having the general formula:

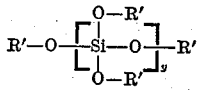

where R' is an alkyl radical of 1 to 6 carbon atoms and y is an integer from 1 to 10, and (2) 100 parts by weight of a vulcanizable organo-polysiloxane gum in which the silicon atoms are connected to each other through silicon-oxygen linkages and which has an average of 1.75 to 2.25 methyl radicals attached through carbon-silicon linkages to each silicon atom, in the presence of a vulcanizing agent for said gum selected from the group consisted of peroxide and perbenzoates, allowing the resulting mixture to age for a period of more than 5 days at temperatures between 60 and 100° F., remilling the mixture and subsequently vulcanizing the mixture to the rubber state.

6. A process as in claim 5, but further characterized in that the silicone gum is a dimethyl silicone gum.

7. A process as in claim 5, but further characterized in that the silicate is tetraethyl orthosilicate.

8. A process of producing a reinforced silicone rubber which comprises milling (1) from 15 to 55 parts by weight of hydrophilic to partially hydrophobic but non-organophilic particles having an aggregate particle size between 0.01 and 15 microns of the reaction product of (A) a silica aerogel having an acid number above 0.2 but below 0.8, a surface area of between 100 and 600 square meters per gram and a bulk density between 2 and 8 pounds per cubic foot and (B) from 3 to 20% by weight, based on the dry aerogel particles, of tetraethyl orthosilicate, and (2) 100 parts by weight of a vulcanizable dimethyl silicone gum, in the presence of a vulcanizing agent for said gum selected from the group consisting of peroxides and perbenzoates until the silica aerogel particles have an ultimate particle size of about 5 to 40 millimicrons, allowing the resulting mixture to age for a period of more than 5 days at temperatures between 60 and 100° F., remilling the mixture and subsequently vulcanizing the mixture.

9. A silicone rubber prepared from a vulcanizable organo-polysiloxane gum in which the silicon atoms are connected to each other by silicon-oxygen linkages and which has an average of 1.75 to 2.25 methyl radicals attached through carbon-silicon linkages to each silicon atom, said rubber being reinforced with hydrophilic to partially hydrophobic but non-organophilic particles of the reaction product of (1) hydrophilic, amorphous, water-insoluble finely divided silica having an acid number above 0.2 but below 0.8 and containing 1000 and more of silanol groups and (2) from 2 to 25% by weight, based on the dry silica particles, of an organic silicate having the general formula:

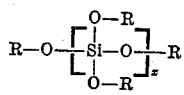

where R is an alkyl radical having from 1 to 6 carbon atoms and x is an integer from 1 to 20.

10. A silicone rubber prepared from a vulcanizable organo-polysiloxane gum in which the silicon atoms are connected to each other by silicon-oxygen linkages and which has an average of 1.75 to 2.25 methyl radicals attached through carbon-silicon linkages to each silicon atom, said rubber being reinforced with from 15 to 55 parts by weight, per 100 parts by weight of said gum, of hydrophilic to partially hydrophobic but non-organophilic particles having an ultimate particle of about 5 to 40 millimicrons of the reaction product of (1) a silica aerogel having an acid number above 0.2 but below 0.8 and (2) from 2 to 25% by weight, based on the dry aerogel, of an organic silicate having the general formula:

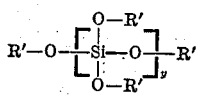

where R' is an alkyl radical having from 1 to 6 carbon atoms and y is an integer from 1 to 10.

11. A reinforced silicone as in claim 10, but further characterized in that the silicone rubber is a dimethyl silicone rubber.

12. A reinforced silicone rubber as in claim 10, but further characterized in that the organic silicate is tetraethyl orthosilicate.

13. A composition of matter comprising a reinforced vulcanized dimethyl silicone rubber containing partially hydrophobic but non-organophilic particles having an ultimate particle size of 5 to 40 millimicrons of the reaction product of (1) a silica aerogel having an acid number above 0.2 but below 0.8 and a surface area between 100 and 600 square meters per gram and (2) from 2 to 20% by weight, based on the dry aerogel particles, of tetraethyl orthosilicate, said composition containing from 25 to 50 parts by weight of said particles for each 100 parts by weight of said dimethyl silicone rubber.

14. Particles of the reaction product of (1) hydrophilic, amorphous, water-insoluble, finely divided silica having an acid number above 0.2 but below 5, an aggregate particle size between 0.01 and 15 microns and having 1000 and more silanol groups and (2) from 2 to 25% by weight, based on the dry silica, of an organic silicate having the general formula:

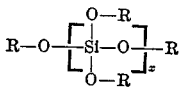

where R is an alkyl radical having from 1 to 6 carbon atoms and x is an integer from 1 to 20, said particles of the reaction product being hydrophilic to partially hydrophobic but non-organophilic.

15. Particles of the reaction product of (1) a silica aerogel having an acid number between 0.3 and 3 and an aggregate particle size between 0.01 and 15 microns and (2) from 3 to 20% by weight, based on the dry aerogel, of tetraethyl orthosilicate, said particles of reaction product being hydrophilic to partially hydrophobic but non-organophilic.

16. Particles of the reaction product of (1) a silica aerogel having an acid number above 0.2 but below 0.8 and an aggregate particle size between 0.01 and 15 microns and (2) from 3 to 20% by weight, based on the dry aerogel, of tetraethyl orthosilicate, said particles of the reaction product being further characterized in that they are partially hydrophobic, but non-organophilic.

17. A process of producing improved silica aerogels which comprises applying to hydrophilic silica aerogel particles having an acid number above 0.2 but below 5 from about 2 to 25% by weight, based on the dry silica aerogel particles, of an organic silicate having the general formula:

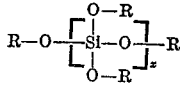

where R is an alkyl radical having from 1 to 6 carbon atoms and x is an integer from 1 to 20, while retaining the structure of said silica aerogel particles, and comminuting said silica aerogel particles until the particles have an aggregate particle size between 0.01 and 15 microns, said silica aerogel particles being at least partly comminuted at some stage after the application of said organic silicate.

18. A process as in claim 17, but further characterized in that the organic silicate is tetraethyl orthosilicate.

19. A process for producing improved silica aerogels which comprises comminuting hydrophilic silica aerogel particles having an acid number between 0.3 and 3 in an air attrition mill and concurrently spraying said aerogel particles with droplets containing an organic silicate having the general formula:

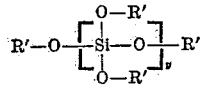

where R' is an alkyl radical having from 1 to 6 carbon atoms and $y$ is an integer from 1 to 10, said comminuting step being carried out at least partly after the application of said silicate to said aerogel particles and until said particles have an aggregate particle size between 0.01 and 15 microns, said silicate being applied in amounts of 2 to 25% by weight, based on the dry silica aerogel particles.

20. A process as in claim 19, but further characterized in that the organic silicate is tetraethyl orthosilicate.

21. A process as in claim 19, but further characterized in that the organic silicate is a mixture of tetraethyl orthosilicate and a polyethyl orthosilicate containing from 2 to 10 silicon atoms in the molecule.

22. Particles of the reaction product of (1) a silica aerogel having an acid number above 0.2 but below 5, an aggregate particle size between 0.01 and 15 microns and (2) from 2 to 25% by weight, based on the dry aerogel, of an organic silicate having the general formula:

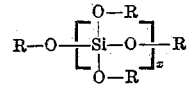

where R is an alkyl radical having from 1 to 6 carbon atoms and $x$ is an integer from 1 to 20, said particles of the reaction product being hydrophilic to partially hydrophobic but non-organophilic.

References Cited in the file of this patent

UNITED STATES PATENTS

| | | |
|---|---|---|
| 2,394,642 | Strain | Feb. 12, 1946 |
| 2,657,149 | Iler | Oct. 27, 1953 |
| 2,744,878 | Smith-Johannsen | May 8, 1956 |

OTHER REFERENCES

C. & E. News: 30, page 4720 (Nov. 10, 1952).